US008213687B2

(12) United States Patent
Fan

(10) Patent No.: US 8,213,687 B2
(45) Date of Patent: Jul. 3, 2012

(54) IMAGE PROCESSING METHODS, IMAGE PROCESSING SYSTEMS, AND ARTICLES OF MANUFACTURE

(75) Inventor: Jian Fan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1636 days.

(21) Appl. No.: 11/414,070

(22) Filed: Apr. 28, 2006

(65) Prior Publication Data

US 2007/0253031 A1    Nov. 1, 2007

(51) Int. Cl.
*G06K 9/00* (2006.01)
(52) U.S. Cl. ........................................................ 382/112
(58) Field of Classification Search .................. 382/174,
382/176, 199, 277, 282, 283, 286, 290, 292,
382/295, 296, 297, 298, 301, 302, 289, 294;
358/449, 451, 452, 453, 462, 464, 528, 530,
358/537, 538; 355/25
See application file for complete search history.

(56) References Cited

U.S. PATENT DOCUMENTS

| | | | | | |
|---|---|---|---|---|---|
| 4,723,297 | A | * | 2/1988 | Postl .............................. | 382/289 |
| 4,739,372 | A | * | 4/1988 | Watanabe ....................... | 355/25 |
| 4,980,720 | A | * | 12/1990 | Siegel ............................. | 399/52 |
| 4,990,956 | A | * | 2/1991 | Iwata .............................. | 399/189 |
| 5,057,869 | A | * | 10/1991 | Graves et al. .................. | 358/486 |
| 5,276,530 | A | * | 1/1994 | Siegel ............................. | 358/406 |
| 5,452,374 | A | * | 9/1995 | Cullen et al. ................... | 382/293 |
| 5,479,262 | A | * | 12/1995 | Namiki et al. .................. | 358/296 |
| 5,483,606 | A | * | 1/1996 | Denber ........................... | 382/294 |
| 5,513,304 | A | * | 4/1996 | Spitz et al. ..................... | 715/268 |
| 5,583,662 | A | * | 12/1996 | Takahashi et al. ............. | 358/474 |
| 5,585,936 | A | * | 12/1996 | Eto et al. ........................ | 358/450 |
| 5,640,252 | A | * | 6/1997 | Turner et al. ................... | 358/497 |
| 5,659,404 | A | * | 8/1997 | Matsuda ......................... | 358/474 |
| 5,677,776 | A | * | 10/1997 | Matsuda et al. ............... | 358/475 |
| 5,717,843 | A | * | 2/1998 | Tabata et al. .................. | 358/1.18 |
| 5,719,968 | A | * | 2/1998 | Hashimoto et al. ............ | 382/288 |
| 5,726,775 | A | * | 3/1998 | Walsh ............................. | 358/488 |
| 5,751,446 | A | * | 5/1998 | Fujioka .......................... | 358/474 |
| 5,760,912 | A | * | 6/1998 | Itoh ................................ | 358/296 |
| 5,760,925 | A | * | 6/1998 | Saund et al. ................... | 358/497 |
| 5,764,383 | A | * | 6/1998 | Saund et al. ................... | 358/497 |
| 5,774,232 | A | * | 6/1998 | Tabata et al. .................. | 358/448 |
| 5,784,487 | A | * | 7/1998 | Cooperman .................... | 382/175 |
| 5,790,262 | A | * | 8/1998 | Kanno ............................ | 358/296 |
| 5,798,841 | A | * | 8/1998 | Takahashi ...................... | 358/296 |
| 5,808,756 | A | * | 9/1998 | Matsuda ......................... | 358/474 |
| 5,831,750 | A | * | 11/1998 | Okisu et al. .................... | 358/493 |
| 5,847,884 | A | * | 12/1998 | Kamon et al. ................. | 359/806 |
| 5,930,001 | A | * | 7/1999 | Satoh et al. .................... | 358/296 |

(Continued)

FOREIGN PATENT DOCUMENTS

JP              55080186  A  *  6/1980

(Continued)

*Primary Examiner* — Vikkram Bali

(57) ABSTRACT

Image processing methods, image processing systems, and articles of manufacture are described. According to one aspect, an image processing method includes defining an image dimension corresponding to a common size of data content of a plurality of images which are associated with one another, determining a plurality of image boundaries individually corresponding to a size of the data content of a respective one of the images, comparing individual ones of the image boundaries with respect to the image dimension providing difference information for respective ones of the images and indicative of differences of the respective image boundaries with respect to the image dimension, and adjusting the images using respective difference information corresponding to respective ones of the images.

17 Claims, 8 Drawing Sheets

U.S. PATENT DOCUMENTS

| | | | | |
|---|---|---|---|---|
| 5,940,544 A * | 8/1999 | Nako | | 382/293 |
| 5,987,163 A * | 11/1999 | Matsuda | | 382/154 |
| 6,011,635 A * | 1/2000 | Bungo et al. | | 358/488 |
| 6,181,820 B1 * | 1/2001 | Tachikawa et al. | | 382/190 |
| 6,281,990 B1 * | 8/2001 | Takahashi | | 358/474 |
| 6,330,050 B1 * | 12/2001 | Takahashi et al. | | 355/25 |
| 6,359,702 B1 * | 3/2002 | Irie et al. | | 358/1.9 |
| 6,360,026 B1 * | 3/2002 | Kulkarni et al. | | 382/289 |
| 6,385,347 B1 * | 5/2002 | Matsuda | | 382/263 |
| 6,385,350 B1 * | 5/2002 | Nicholson et al. | | 382/309 |
| 6,456,732 B1 * | 9/2002 | Kimbell et al. | | 382/112 |
| 6,687,420 B1 * | 2/2004 | Matsuda et al. | | 382/286 |
| 6,766,055 B2 * | 7/2004 | Matsugu et al. | | 382/173 |
| 6,782,143 B1 * | 8/2004 | Dube et al. | | 382/300 |
| 6,806,980 B2 * | 10/2004 | Xu et al. | | 358/474 |
| 6,816,624 B1 * | 11/2004 | Ebisawa et al. | | 382/275 |
| 6,836,568 B1 * | 12/2004 | Morishita | | 382/219 |
| 6,885,479 B1 * | 4/2005 | Pilu | | 358/474 |
| 6,909,805 B2 * | 6/2005 | Ma et al. | | 382/170 |
| 6,954,290 B1 * | 10/2005 | Braudaway et al. | | 358/3.26 |
| 7,006,263 B2 * | 2/2006 | Takahashi | | 358/474 |
| 7,010,745 B1 * | 3/2006 | Shimada et al. | | 715/205 |
| 7,016,081 B2 * | 3/2006 | Araki et al. | | 358/3.26 |
| 7,016,536 B1 * | 3/2006 | Ling et al. | | 382/190 |
| 7,016,552 B2 * | 3/2006 | Koyama | | 382/289 |
| 7,072,527 B1 * | 7/2006 | Nako | | 382/290 |
| 7,133,638 B2 * | 11/2006 | Kelly et al. | | 399/376 |
| 7,170,644 B2 * | 1/2007 | Loce et al. | | 358/3.26 |
| 7,215,445 B2 * | 5/2007 | Braudaway et al. | | 358/3.26 |
| 7,330,604 B2 * | 2/2008 | Wu et al. | | 382/289 |
| 7,345,796 B2 * | 3/2008 | Sasama | | 358/488 |
| 7,362,455 B2 * | 4/2008 | Xiong | | 358/1.13 |
| 7,417,765 B2 * | 8/2008 | Araki | | 358/1.9 |
| 7,418,126 B2 * | 8/2008 | Fujimoto et al. | | 382/154 |
| 7,430,065 B2 * | 9/2008 | Arakai et al. | | 358/3.26 |
| 7,454,697 B2 * | 11/2008 | Kremer et al. | | 715/251 |
| 7,463,772 B1 * | 12/2008 | Lefevere et al. | | 382/215 |
| 7,477,426 B2 * | 1/2009 | Guan et al. | | 358/474 |
| 7,599,556 B2 * | 10/2009 | Czyszczewski et al. | | 382/173 |
| 7,602,995 B2 * | 10/2009 | Araki et al. | | 382/290 |
| 2002/0085247 A1 * | 7/2002 | Xu et al. | | 358/504 |
| 2002/0138508 A1 * | 9/2002 | Wiechers et al. | | 707/500 |
| 2003/0142884 A1 * | 7/2003 | Cariffe | | 382/285 |
| 2003/0198398 A1 * | 10/2003 | Guan et al. | | 382/255 |
| 2003/0208502 A1 * | 11/2003 | Lin | | 707/101 |
| 2004/0042678 A1 * | 3/2004 | Loce et al. | | 382/255 |
| 2004/0169870 A1 * | 9/2004 | Ahmed et al. | | 358/1.8 |
| 2004/0252342 A1 * | 12/2004 | Kawahira | | 358/1.18 |
| 2005/0053304 A1 * | 3/2005 | Frei | | 382/257 |
| 2005/0185225 A1 * | 8/2005 | Brawn et al. | | 358/401 |
| 2005/0185858 A1 * | 8/2005 | Kaneda | | 382/295 |
| 2005/0244079 A1 * | 11/2005 | Lin et al. | | 382/294 |
| 2006/0007505 A1 * | 1/2006 | Chelvayohan et al. | | 358/464 |
| 2006/0033967 A1 * | 2/2006 | Brunner | | 358/474 |
| 2006/0215231 A1 * | 9/2006 | Borrey et al. | | 358/448 |
| 2008/0137987 A1 * | 6/2008 | Kojima et al. | | 382/275 |
| 2009/0016606 A1 * | 1/2009 | Meyer et al. | | 382/176 |

FOREIGN PATENT DOCUMENTS

| | | |
|---|---|---|
| JP | 55143684 A * | 11/1980 |
| WO | WO 0103416 A1 * | 1/2001 |

* cited by examiner

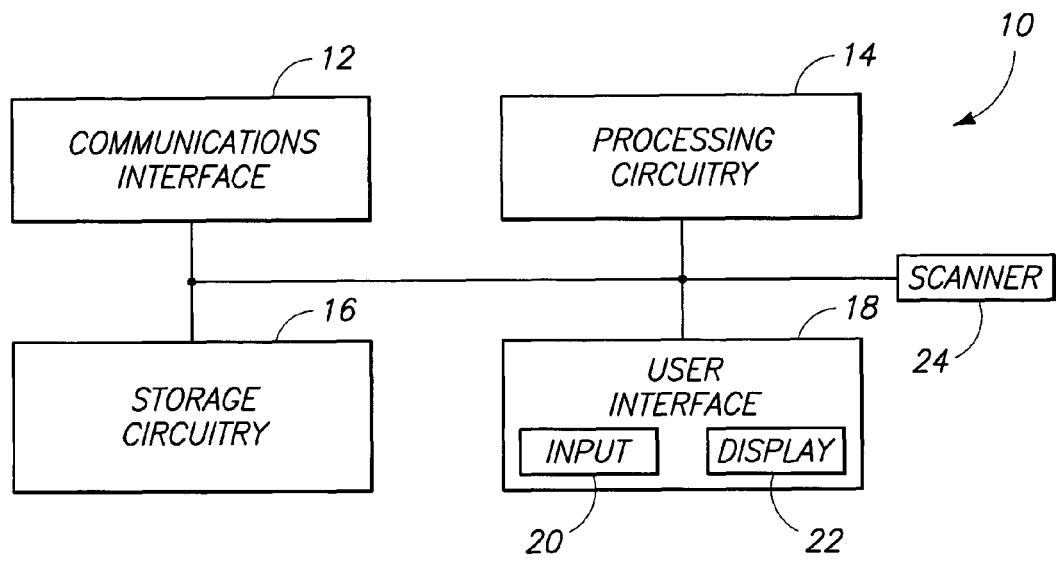
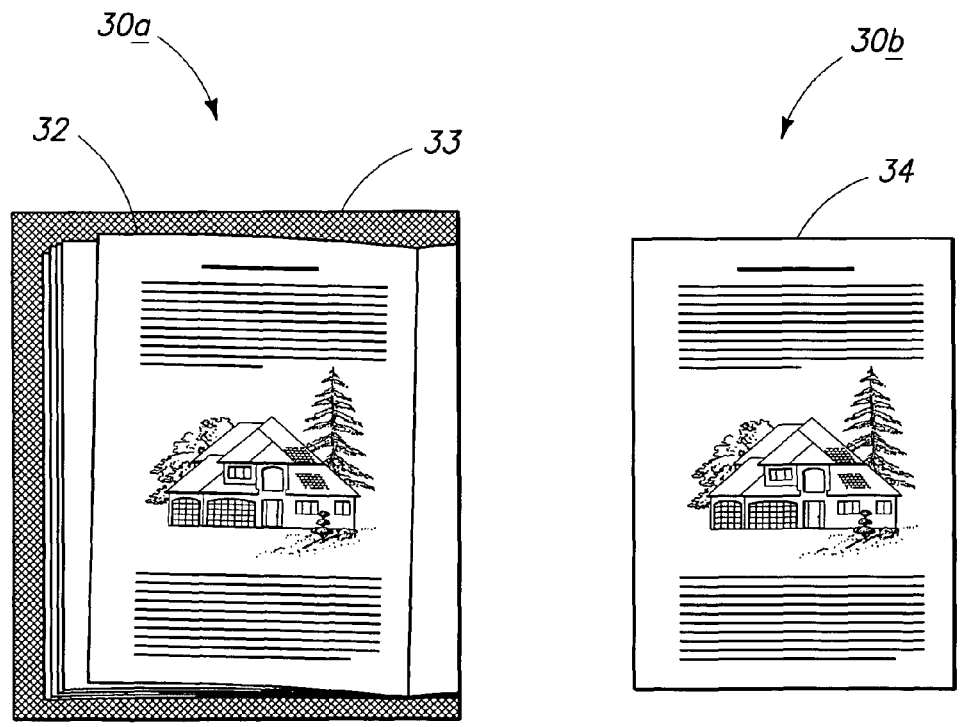

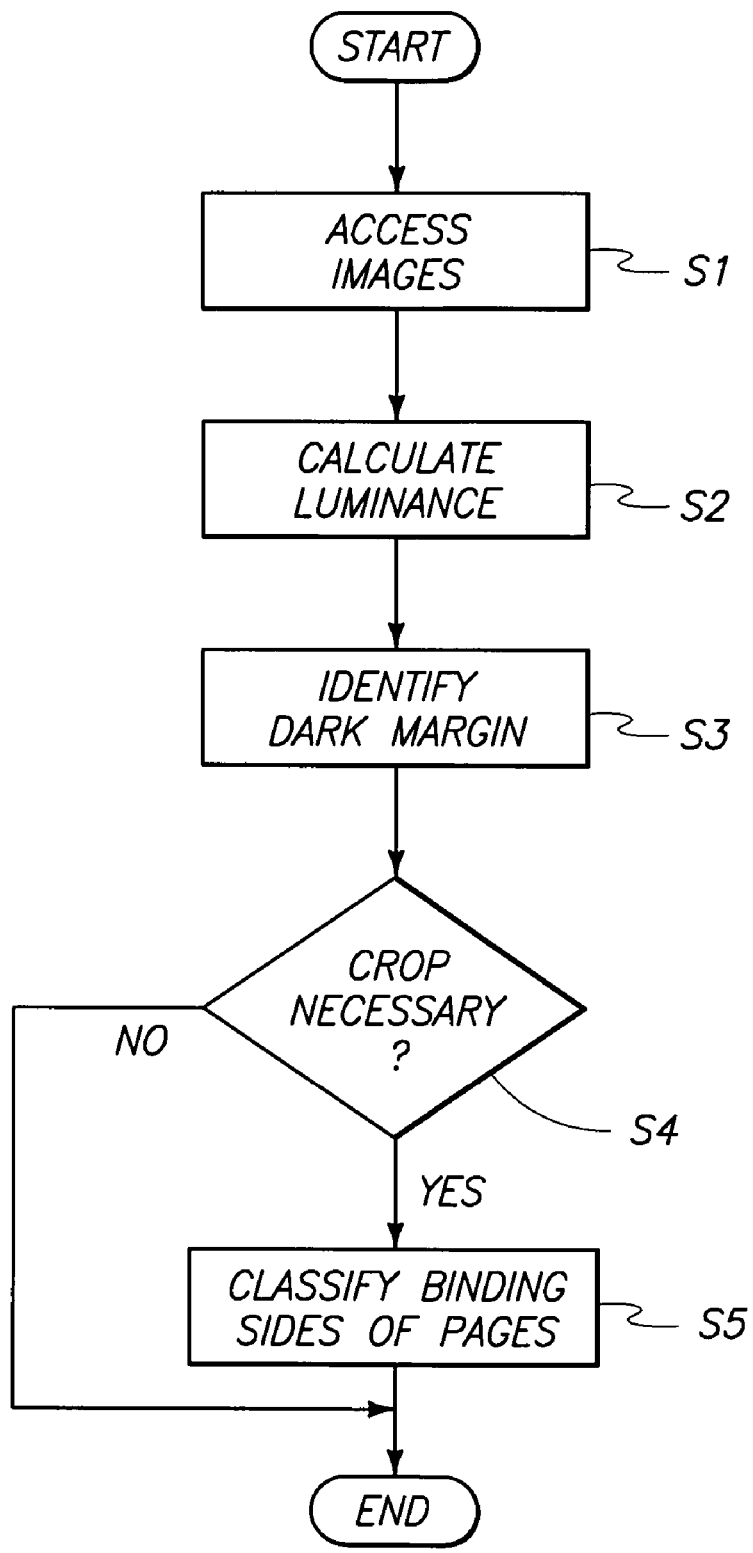

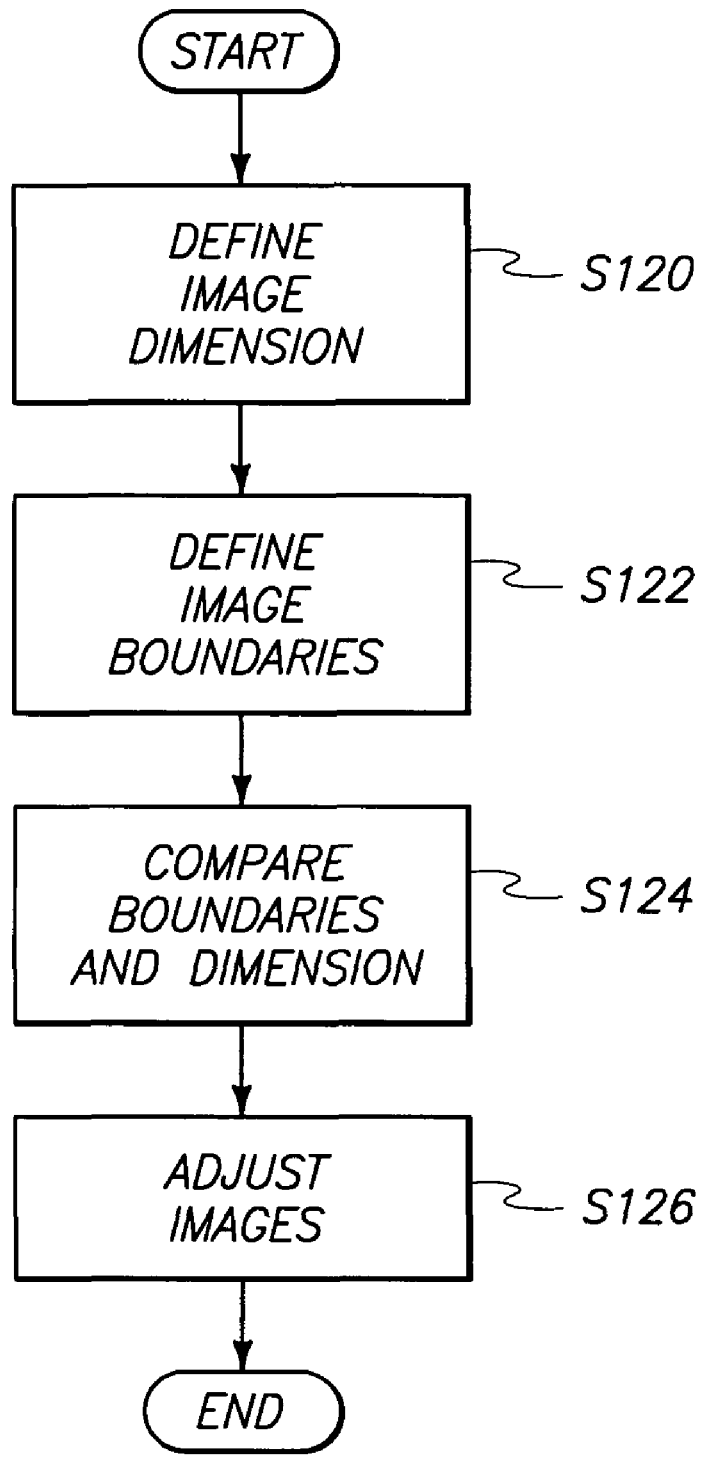

US 8,213,687 B2

IMAGE PROCESSING METHODS, IMAGE PROCESSING SYSTEMS, AND ARTICLES OF MANUFACTURE

FIELD OF THE DISCLOSURE

Aspects of the disclosure relate to image processing methods, image processing systems, and articles of manufacture.

BACKGROUND

Imaging systems including image capture and image generation devices have been continually improved in recent years. Accordingly, imaging systems are utilized in an increasing number of applications as the quality of the systems has improved. For example, in some applications, a user may desire to copy a book while the book is in bound form.

However, certain drawbacks exist with manual flatbed copying of books. Initially, extra dark margins are typically generated outside of the boundaries of the pages of the book. Furthermore, portions of an adjacent page of a book may be copied and included in an image of a subject page being copied. Also, skew of a page relative to a scanner bed may be introduced causing skew of the scanned page relative to a horizontal viewing line.

As a result, the appearance or quality of the resultant images may not only be degraded by manual flatbed copying, the sizes of the files of the images may include unnecessary data for the dark margins, adjacent pages, etc. The inclusion of unnecessary data needlessly increases the sizes of the files being processed and stored.

At least some aspects of the disclosure include methods and apparatus for providing improved image processing including improved processing of scanned images.

SUMMARY

According to some aspects of the disclosure, exemplary image processing methods, image processing systems, and articles of manufacture are described.

According to one embodiment, an image processing method comprises defining an image dimension corresponding to a common size of data content of a plurality of images which are associated with one another, determining a plurality of image boundaries individually corresponding to a size of the data content of a respective one of the images, comparing individual ones of the image boundaries with respect to the image dimension providing difference information for respective ones of the images and indicative of differences of the respective image boundaries with respect to the image dimension, and adjusting the images using respective difference information corresponding to respective ones of the images.

According to another embodiment, an image processing system comprises processing circuitry configured to access a plurality of images which are associated with one another, to process the images which includes using one of the images to identify a portion of another of the images, and to crop the identified portion of the another of the images after the identification.

Additional embodiments are disclosed as is apparent from the following disclosure.

DESCRIPTION OF THE DRAWINGS

FIG. 1 is a functional block diagram of an image processing system according to one embodiment.

FIGS. 2A and 2B illustrate exemplary scanned and processed images, respectively, according to one embodiment.

FIG. 3 is a flow chart of an exemplary method for processing images according to one embodiment.

FIG. 11 is a flow chart of an exemplary image processing method according to one embodiment.

DETAILED DESCRIPTION

Figure 4:
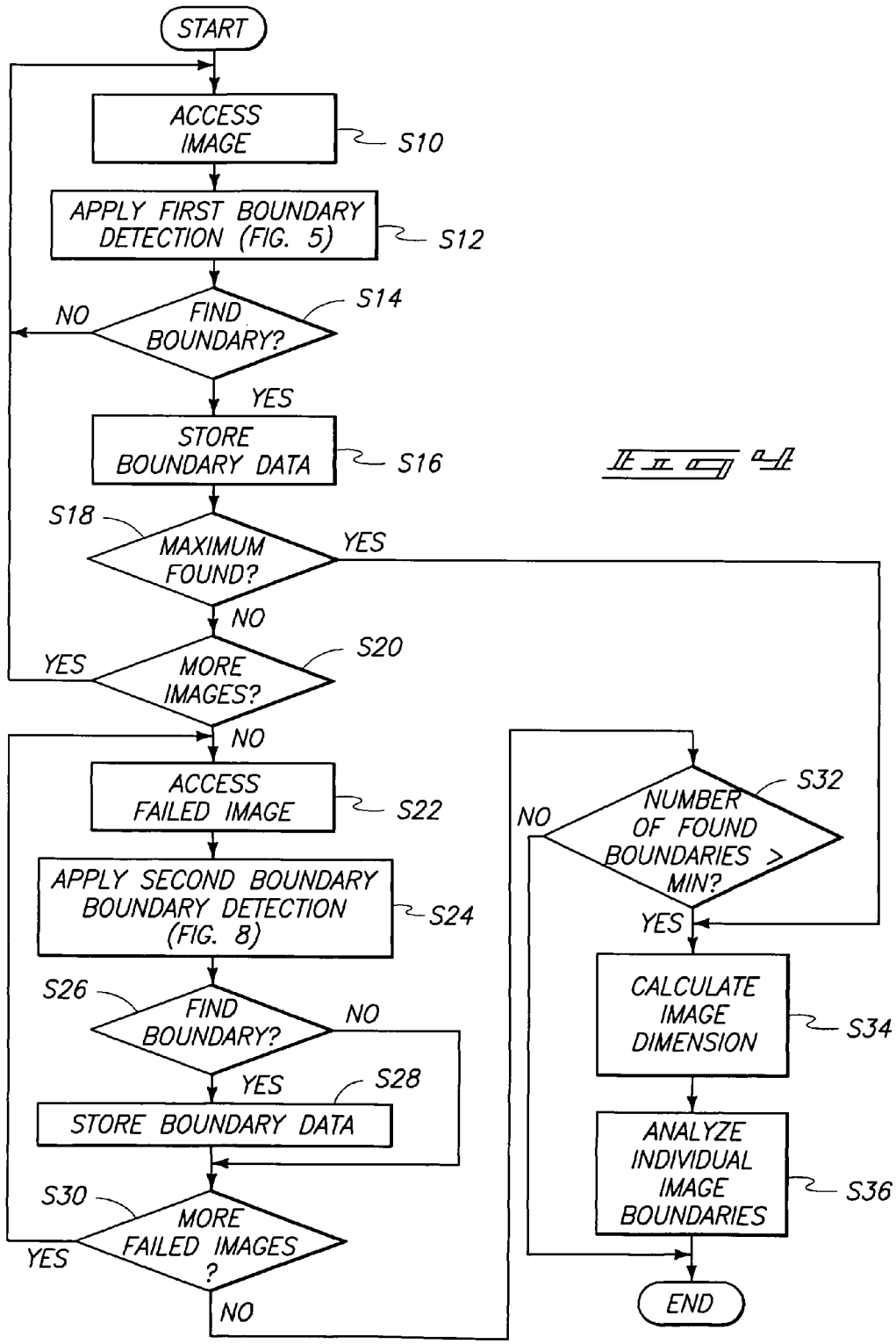
FIG. 4 is a flow chart of an exemplary method for attempting to determine a common dimension of plural scanned images according to one embodiment.

According to at least one embodiment, apparatus and methods for processing of images are described. Certain aspects of the disclosure are directed towards processing of images of a job wherein the images may be related to one another. One example of a job includes a plurality of images which may correspond to a plurality of consecutive numbered pages. For example, the images of a job may be generated by scanning pages still bound to a spine of a book. Some aspects of the disclosure include automatically (e.g., without user input) determining whether cropping of images is necessary and automatically performing cropping and deskewing of the images if appropriate. Details of some embodiments configured to implement cropping and deskewing of images are described below. Images may be referred to as pages in embodiments wherein pages of a book are scanned and processed.

Referring to FIG. 1, an exemplary configuration of an image processing system is depicted with respect to reference numeral 10. Image processing system 10 of the embodiment of FIG. 1 includes a communications interface 12, processing circuitry 14, storage circuitry 16, a user interface 18 and a scanner 24. The depicted image processing system 10 is shown according to one possible embodiment and is configured to implement processing of images as described in further detail below. Other configurations of image processing system 10 are possible including more, less or alternative components.

Image processing system 10 may be implemented differently in different applications. For example, in the embodiment of FIG. 1, image processing system 10 is shown implemented in a stand alone personal computer arrangement or work station configured to access images generated by scanner 24 or other devices. In other possible embodiments, the image processing system 10 may be embedded within an image capture device (e.g., scanner or copier) or image generation device (e.g., printer or digital press). In exemplary embedded embodiments, communications interface 12, processing circuitry 14, storage circuitry 16, user interface 18 and scanner 24 may be implemented using existing components of the image capture or generation devices. Image processing system 10 may be implemented in any desired application where processing of images is desired.

Communications interface 12 is arranged to implement communications of image processing system 10 with respect to external devices (not shown). For example, communications interface 12 may be arranged to communicate information bi-directionally with respect to image processing system 10. For example, communications interface 12 may be implemented as a network interface card (NIC), serial or parallel connection, USB port, Firewire interface, flash memory interface, floppy disk drive, or any other suitable arrangement for communicating with respect to devices external of image processing system 10.

In one embodiment, processing circuitry 14 is arranged to process data, control data access and storage, issue commands, and control other desired operations of image processing system 10. For example, processing circuitry 14 may access a plurality of files comprising data of a plurality of images associated with one another to be processed. In one embodiment, images associated with one another may have a common size (e.g., images of different pages of a book). The files may be generated using scanner 24 or other appropriate source for providing images to be processed.

Processing circuitry 14 may comprise circuitry configured to implement desired programming provided by appropriate media in at least one embodiment. For example, the processing circuitry 14 may be implemented as one or more of a processor or other structure configured to execute executable instructions including, for example, software or firmware instructions, or hardware circuitry. Exemplary embodiments of processing circuitry 14 include hardware logic, PGA, FPGA, ASIC, state machines, or other structures alone or in combination with a processor. These examples of processing circuitry 14 are for illustration and other configurations are possible.

Storage circuitry 16 is configured to store programming such as executable code or instructions (e.g., software or firmware), image files, electronic data, databases, or other digital information and may include processor-usable media. Processor-usable media includes any computer program product or article of manufacture which can contain, store, or maintain programming, data or digital information for use by or in connection with an instruction execution system including processing circuitry 14 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, or other configurations capable of storing programming, data, or other digital information.

At least some embodiments or aspects described herein may be implemented using programming stored within appropriate storage circuitry 16 described above or communicated via a network or using another transmission medium and configured to control appropriate processing circuitry 14. For example, programming may be provided via appropriate media including for example articles of manufacture, embodied within a data signal (e.g., modulated carrier wave, data packets, digital representations, etc.) communicated via an appropriate transmission medium, such as a communication network (e.g., the Internet or a private network), wired electrical connection, optical connection or electromagnetic energy, for example, via communications interface 12, or provided using other appropriate communication structure or medium. Exemplary programming including processor-usable code may be communicated as a data signal embodied in a carrier wave in but one example.

User interface 18 is configured to interact with a user including conveying data to a user (e.g., displaying data for observation by the user, audibly communicating data to a user, etc.) as well as receiving inputs from the user. Accordingly, in one exemplary embodiment, the user interface 18 may include an input 20 (e.g., tactile input, voice instruction, etc.) for receiving user instructions or commands and a display 22 (e.g., cathode ray tube, LCD, etc.) configured to depict visual information. Any other suitable apparatus for interacting with a user may also be utilized.

Scanner 24 is configured to generate a plurality of files (e.g., JPEG, TIFF, BMP, etc.) of scanned images. In one embodiment, scanner 24 is configured to scan a plurality of consecutive pages of a book which may or may not be bound. For example, scanner 24 may include a flatbed configured to receive pages of a bound book for scanning. Other scanning embodiments are possible, for example, comprising an automatic document feeder.

Referring to FIGS. 2A-2B, exemplary details regarding processing of images are shown. FIG. 2A illustrates an image 30a as generated by an image generation device prior to processing by system 10 and image 30a corresponds to a scanned page of a bound book in the depicted embodiment. Image 30a includes a border 32 which may correspond to the edges of a page of a bound book in embodiments directed towards processing of images from books. FIG. 2B depicts a processed image 30b resulting from processing of image 30a by image processing system 10. An image boundary 34 of image 30b generally corresponds to border 32 of FIG. 2A and defines the extent of data content of the page desired to be reproduced from other data present in the given image external of the boundary and which may be discarded without loss of data content of the image. Image 30a includes an image border 33 corresponding to the border of an image as scanned. Portions of image 30a which are discarded correspond to content external of border 32 and within border 33 in one embodiment.

In a more specific exemplary book example, data content may include body content (e.g., textual content and graphical content of the page forming substantially rectangular content in typical books), and additional content such as headers, footers, page numbers, margins and any additional information appearing on the page in addition to the body content of the image. Original images may also comprise extraneous content (e.g., dark margins, portions of other pages, etc.) in addition to the data content. In exemplary embodiments, methods and apparatus of the disclosure may identify the extraneous content and crop the extraneous content and deskew the data content of images if appropriate.

Image boundary 34 may be referred to as a page boundary in configurations wherein the images are pages of a book. As shown, processing of the image may include cropping data outside of border 32 and deskewing operations may be implemented with respect to the remaining data content of the image 30b. The deleted extraneous content may include extra dark margins outside of border 32 and the parts of other pages which in combination with skew of the page relative to a horizontal viewing line may degrade the quality of the scanned images for viewing and printing, include unnecessary data and increase a file size of the image 32a. FIG. 2B illustrates an image 32b of significantly enhanced quality and reduced file size.

According to one implementation for processing images corresponding to pages of a book, cropping and deskewing may be implemented in three steps including determining of a common dimension (width and height) of pages, determining page boundaries for the respective pages such that the pages have substantially the same dimension (except the front and back covers of a book if scanned), and cropping and deskewing the pages.

Exemplary processing of images is described below according to embodiments of the disclosure in a plurality of flow charts. The flow charts illustrate steps of exemplary methodologies which may be executed by appropriate processing logic, such as processing circuitry 14. Other methods are possible including more, less or alternative steps.

Referring to FIG. 3, an exemplary flow chart of a method for determining whether cropping of an image is appropriate is shown. In one embodiment, one or more of the following assumptions may be made with respect to processing images of a book. For example, when present, extra margins are assumed to have significantly darker luminance compared with the background of scanned pages; the majority of book pages are scanned in a normal orientation such that the left and right side of the page appear in the left and right side of the image, respectively; a scanned image contains one page and possibly a small portion of an adjacent page of the book but not two pages; some pages of a book contain mostly black text on a relatively light background in a single column rectangular format; an image dimension is not too small relative to a dimension of content of the page (e.g., image dimensions are larger than 70% of the respective dimensions of the image content); possible skew angles are relatively small (e.g., in a range of +/−7 degrees from a horizontal viewing line); and the pages are scanned in sequential order.

Image dimension refers to dimensions of a common size of data content of a plurality of images to be processed. In embodiments wherein the scanned images correspond to the pages of a book, the image dimension may be referred to as a page dimension corresponding to common dimensions (e.g., height and width) of data content of the scanned pages. An image or page dimension may specify one or more dimension which includes body content, and perhaps additional content such as margins, page numbers or any additional information appearing on the page outside of the body content of the image.

At a step S1, the processing circuitry may access image files of the images.

At a step S2, the processing circuitry calculates luminance information of the images in an effort to determine whether dark margins are present at the sides of the scanned images. For example, the processing circuitry may analyze left and right regions of individual ones of the images to determine whether dark margins are present. The margins may be proportional to the dimension of the pages in one embodiment. In one embodiment, the left and right regions may be 1/50th of the image width and 1/5 of the image height positioned at the middle of the image in the vertical direction. $I_L$ and $I_R$ correspond to the average luminance of the left and right analyzed regions of the image, respectively, in one embodiment.

At a step S3, the processing circuitry uses the luminance information of the regions to determine whether the dark margins are present at the left or right sides of the images being processed (or not present). In one embodiment, the processing circuitry may perform the determination according to the following:

If $I_L < I_O$ and $I_R > (I_L + \Delta)$
The extra dark margin is present at the left side;
Else If $I_R < I_O$ and $I_L > (I_R + \Delta)$
The extra dark margin is present at the right side;
Else
The presence of the extra dark margin cannot be determined.

In one implementation, $I_O = 50$ and $\Delta = 50$.

At a step S4, the margin information is processed to determine whether the images are suitable for cropping. In one embodiment, the processing circuitry processes margin information for N (e.g., seven in one embodiment) consecutive pages after a front cover page of a book (if present). If the dark margins are present for all N pages, and the presence of the sides of the margins are consistent (e.g., images of pages with an odd number have an extra margin at the same side and images of pages with an even number have an extra margin at the opposite side), then cropping is determined to be appropriate and the processing circuitry proceeds to step S5.

At a step S5, the processing circuitry classifies the binding sides of the pages (e.g., indicates which sides of the individual images correspond to the sides of the pages bound to a spine of the book). Exemplary details regarding cropping are discussed below.

Referring to FIG. 4, an exemplary method is illustrated which may be performed if cropping is desired as determined by the method of FIG. 3 to attempt to identify a common image (e.g., page) dimension corresponding to the dimensions of borders 32 of the images 30a being processed. For images scanned from pages of a book, it is desirable to provide an accurate page dimension for the pages to provide accurate cropping. As discussed below, a plurality of boundary detection methods may be used in one embodiment to find the dimensions of boundaries 34 of individual pages of the book in an attempt to provide a common page dimension. The dimensions of boundaries 34 of a plurality of pages may be used to identify the page dimension and the page dimension may be used to identify portions of the individual pages 34 for cropping as discussed in further detail below in one exemplary embodiment.

At a step S10, the processing circuitry accesses an image to be processed.

At a step S12, the processing circuitry uses a first boundary detection method in an attempt to find a boundary 34 (e.g., rectangle) of the respective image being processed. For example, the first boundary detection method may attempt to estimate a rectangular boundary of a page by growing an initial bounding box which corresponds to body content of the image. Details of one possible exemplary first boundary detection method are described with respect to FIG. 5. The first boundary detection method generally provides a more precise estimation (if the boundary is detected) compared with a second boundary detection method described below.

At a step S14, it is determined whether boundary 34 was identified. If not, the processing circuitry may return to step S10 to access another image to be processed.

If a boundary 34 is determined at step S14, the processing circuitry may proceed to a step S16 to store the boundary data associated with the respective image as well as the type of method which determined the boundary.

At a step S18, the processing circuitry determines whether boundaries have been identified for a maximum number (e.g., 30) of images. If the condition of step S18 is affirmative, the processing circuitry may proceed to step S34 described below.

If the condition of step S18 is negative, the processing circuitry may proceed to a step S20 to determine whether additional images of the book remain to be processed according to the first boundary detection method. If the condition of step S20 is affirmative, the processing circuitry may return to step S10 to access data of the next image.

If the condition of step S20 is negative, the processing circuitry may proceed to a step S22 to perform additional processing in attempts to determine boundaries of the images in which the first boundary detection method of step S12 failed to locate a boundary.

At a step S24, the data of the failed image may be processed using a second boundary detection method. For example, one second boundary detection method may detect the largest rectangle within an image. Details of one possible exemplary second boundary detection method are described with respect to FIG. 8. The second boundary detection method is generally not as precise as the first method but may have an increased chance of locating a boundary for a given image if the first boundary detection method fails.

At a step S26, it is determined whether a boundary of the failed image was determined. If not, the processing circuitry proceeds to a step S30.

If the condition of step S26 is affirmative, the processing circuitry proceeds to a step S28 and stores the boundary data for the respective image as well as the type of method which determined the boundary.

At step S30, the processing circuitry determines whether additional failed images remain for processing. The processing circuitry reverts to step S22 if the condition of step S30 is affirmative.

If the condition of step S30 is negative, the processing circuitry proceeds to a step S32 to determine whether the number of images for which a boundary was determined exceeds a minimum threshold (e.g., five images). If the condition of step S32 is negative, the processing circuitry exits without cropping.

If the condition of step S32 is affirmative, the processing circuitry proceeds to a step S34 to calculate an image dimension (e.g., width ($W_p$) and height ($H_p$)) corresponding to a common image dimension for the images being processed. In one embodiment, the calculation involves sorting the widths and heights and selecting the median values, respectively, to provide the width $W_p$ and height $H_p$. The image dimension may be referred to as a page dimension in configurations wherein the images being processed are pages of a book.

At a step S36, the processing circuitry analyzes individual ones of the boundaries of the images identified with respect to the page dimension. If a detected boundary is off of the page dimension by a threshold (e.g., 10%) or more, the detected boundary for the image is discarded and may be subsequently determined in exemplary embodiments described below.

Figure 5:
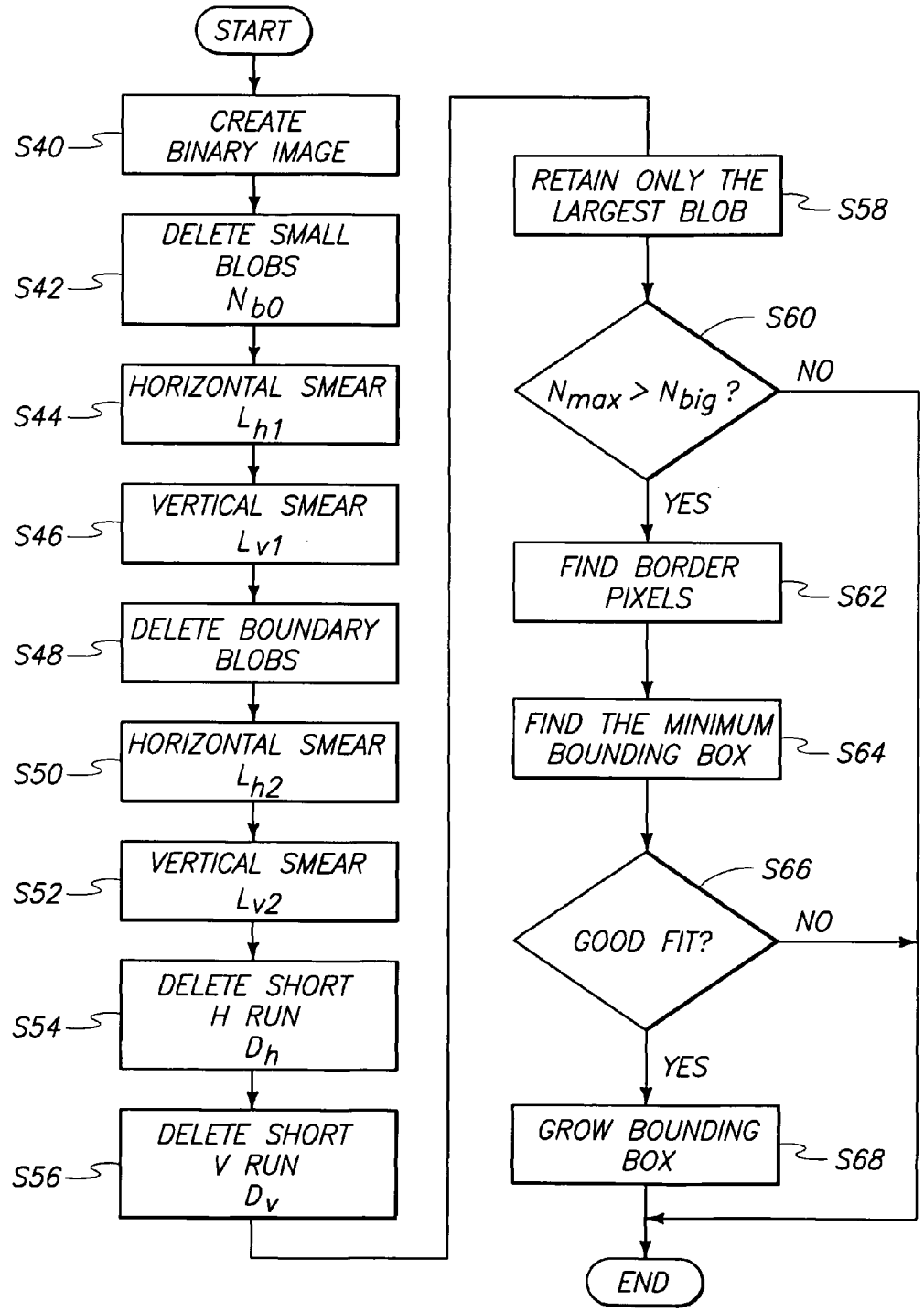
FIG. 5 is a flow chart of an exemplary method for attempting to determine a boundary of an image according to one embodiment.

Referring to FIG. 5, the first page boundary detection method attempts to estimate a boundary of an image comprising a page using rectangular content. The method assumes body content of a page is of rectangular shape. In general, the method separates pixels containing data content of the image which may be referred to as content pixels (and which be assigned a 0 value) from pixels containing background information (e.g., margins, other pages, etc.) and may be referred to as background pixels (and which be assigned a 1 value). The method attempts to group the content pixels into a rectangular region.

Initially, at a step S40 the processing circuitry creates a working binary image of the image being processed. One exemplary method includes converting the data of the image into a grayscale image and then a binary image using a thresholding algorithm such as Kittler and Illingworth's minimum error thresholding method described in Kittler, J. et al., "Minimum Error Thresholding", Pattern Recognition, Vol. 19, No. 1, 41-47, 1986, the teachings of which are incorporated by reference herein. Thereafter, the processing circuitry attempts to identify a bounding rectangle for data content as described below.

At a step S42, the processing circuitry operates to define blobs Nb0 present within an image. An individual blob is an aggregates of content pixels which are interconnected by an 8 pixel neighborhood. Additional details regarding pixel connectivity are defined in Rafael C. Gonzalez et al., "Digital Image Processing", Second Edition, Addison-Wesley, Reading Mass., 1987, the teachings of which are incorporated by reference herein. Small blobs are deleted in step S42 while the largest blob is retained wherein the largest blob may defined as containing the largest number of content pixels.

At a step S44, the processing circuitry performs horizontal smearing operations for a set value $L_{h1}$. At step S44, the processing circuitry may scan the image row-by-row and if a gap of background pixels between two adjacent content pixels is less than a set value ($L_{h1}$), then the processing circuitry may change the background pixels in the gap to content pixels between the adjacent content pixels. Value $L_{h1}$ may be a relatively small value in one embodiment (e.g., $L_{h1}$=0.1*dpi where dpi is the image resolution of the image being analyzed). More details of the smearing operation can be found in K. Y. Wong et al., "Document Analysis System", IBM J. Develop, Vol. 26, No. 6, November 1982, the teachings of which are incorporated by reference herein.

At a step S46, the processing circuitry scans the image column-by-column and performs vertical smearing operations similar to the row operations described with respect to step S44. In one embodiment, $L_{v1}$ is also defined as 0.1*dpi.

At a step S48, boundary blobs are deleted. A boundary blob is one which has at least one pixel touching a boundary of the image in one embodiment.

At a step S50, the processing circuitry implements horizontal smearing operations similar to step S44 except using a larger value $L_{h2}$ which may be equal to dpi/3 in one embodiment.

At a step S52, the processing circuitry implements vertical smearing operations similar to step S46 except using a larger value $L_{v2}$ which may be equal to (2*dpi)/3 in one embodiment.

At a step S54, the processing circuitry performs a delete short horizontal (h) run where the image is scanned row-by-row. If consecutive content pixels between adjacent background pixels of a row are less than a set value ($D_h$), then the content pixels are replaced with background pixels. In one embodiment, the set value $D_h$ is equal to (dpi)/15.

At a step S56, the processing circuitry performs a delete short vertical (v) run where the image is scanned column-by-column. If consecutive content pixels between adjacent background pixels of a column are less than a set value ($D_v$), then the content pixels are replaced with background pixels. In one embodiment, the set value $D_v$ is equal to (dpi)/15.

At a step S58, the largest blob is retained.

At a step S60, the size (number of content pixels) of the retained (i.e., largest) blob ($N_{max}$) is compared with respect to a threshold ($N_{big}$). In one embodiment, the threshold $N_{big}$ is proportional to the total number of pixels of the image and may be equal to 30% in one implementation. The first boundary detection method of FIG. 5 fails to find the boundary of the image if the condition- of step S60 is not met.

The processing circuitry proceeds to a step S62 if the condition of step S60 is satisfied. At step S62, the border (e.g., exterior boundary) pixels of the largest blob are identified. In one embodiment, any content pixel having contact with at least one non-contact pixel is defined as a boundary pixel.

At a step S64, the processing circuitry identifies a minimum or initial bounding rectangle or box which contains the border pixels of the largest blob. The initial bounding box may or may not be aligned with borders of the image. In one embodiment, a search of a predefined range of skew angles (e.g., −6 to +6 degrees) is performed at a given search resolution (e.g., 0.2 degrees). For each degree being searched, the boundary pixels may be rotated and the minimum rectangle which contains the boundary pixels may be identified. A rectangle with the smallest area may be defined as the bounding rectangle of the largest blob in one embodiment.

At a step S66, it is determined whether the located initial bounding box is a good fit. In one embodiment, for each boundary pixel, distances are computed to the four sides of the bounding rectangle. If a distance is less than $D_{max}$ (e.g., 8 pixels for 300 dpi images), a corresponding count (associated with the respective side) is increased by 1. For each side of the bounding rectangle, a fitting value is computed by dividing the corresponding count value (the number of pixels matched to this side) by the length of the side. If the fitting value is above 0.60, the side is said to have a high confidence match. If the fitting value is below 0.60, but above 0.30, the side is said to have a low confidence match. The bounding rectangle is acceptable if it has at least one high confidence match and one low confidence match for both the horizontal and vertical pairs of sides. If the condition of step S66 is not met, the processing circuitry will indicate a failure to locate an initial bounding box.

If the condition of step S66 is satisfied, the processing circuitry proceeds to step S68 to grow the initial bounding box in an attempt to locate the boundary of the image corresponding to border 32 of FIG. 2A in one embodiment. At a step S68, the bounding box is grown by moving the four lines of the bounding box outwards until a stopping condition is met. In one embodiment, the discrete points of the four lines are calculated. Since skew angles are presumed to be relatively small, the line movements may be approximated in the horizontal or vertical directions. For each new position, a gradient is computed for the new points of the lines and the number of points where the respective gradient exceeds a respective threshold ($T_g$). The threshold $T_g$ for growth in the horizontal direction may be set to 15 while the threshold $T_g$ for growth in the vertical direction may be set to 20 in one embodiment. The movement of the lines may be stopped if the count of gradients exceeding the thresholds of a line exceed a set percentile (e.g., 75%) of the length of the respective line segment in one embodiment. The bounding box may be considered to correspond to border 32 of image 30a when the stopping condition is met in step S68.

Figure 6:
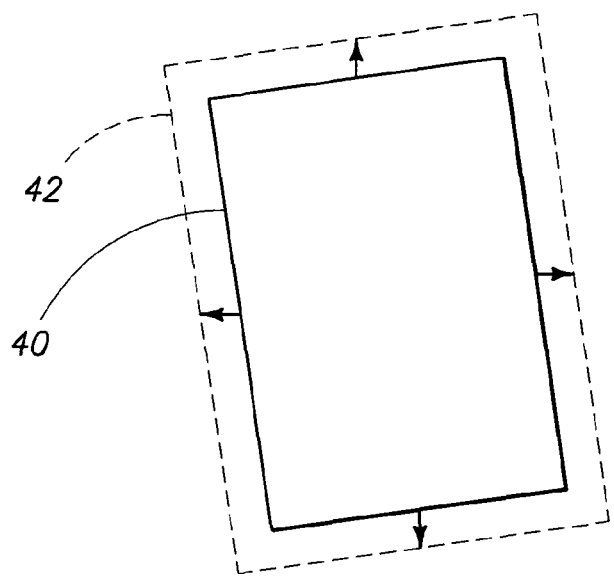
FIG. 6 is an illustrative representation of bounding boxes utilized in the method of FIG. 5 according to one embodiment.

Referring to FIG. 6, an initial bounding box 40 is initially provided by the method of FIG. 5 corresponding to a largest identified blob. The horizontal and vertical lines of the bounding box 40 may be grown outwards to define a rectangle 42 in the illustrated embodiment which may correspond to border 32 of the page shown in image 30a as described with respect to the method of FIG. 5.

Figures 7A, 7B:
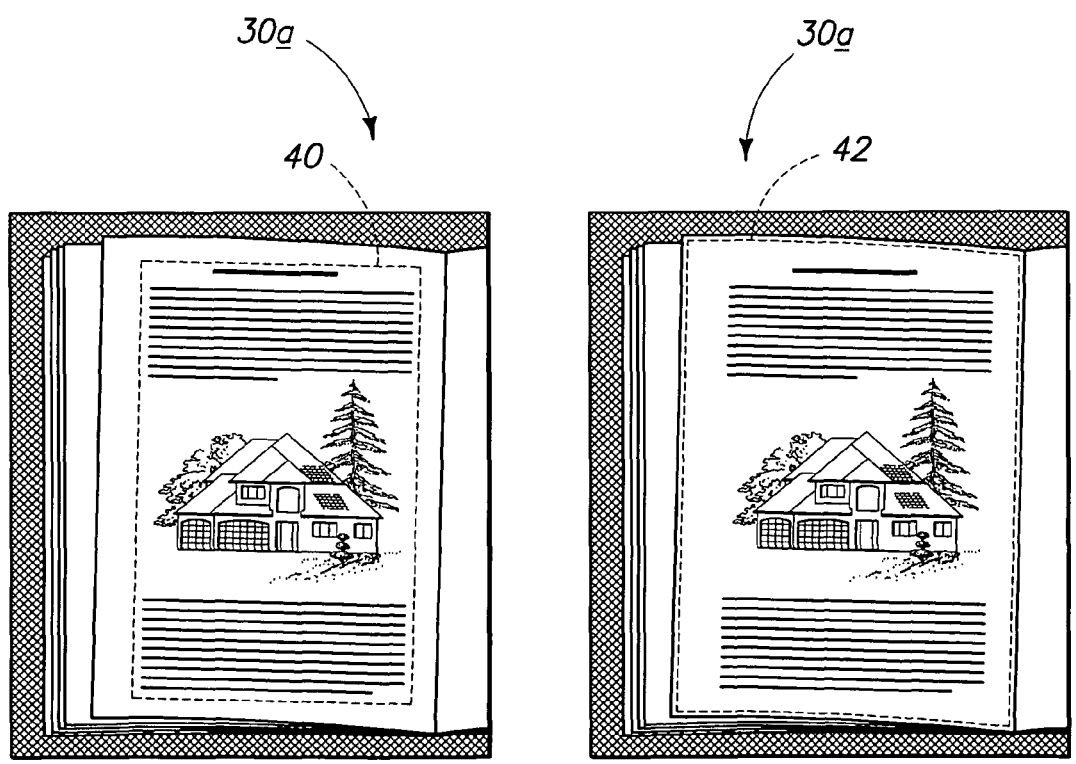
FIGS. 7A and 7B are illustrative representations of bounding boxes relative to a page according to one embodiment.

Referring to FIGS. 7a-7b, an exemplary initial bounding box 40 is shown with respect to image 30a in FIG. 7a. The initial bounding box 40 may be grown to bounding box 42 of FIG. 7b when an appropriate stopping condition is met. Bounding box 42 may be referred to as an image boundary for the respective image. In the depicted example of processing of images of a bound book, the image boundary may be referred to as a page boundary and correspond to boundary 34 of image 30b shown in FIG. 2b.

Figure 8:
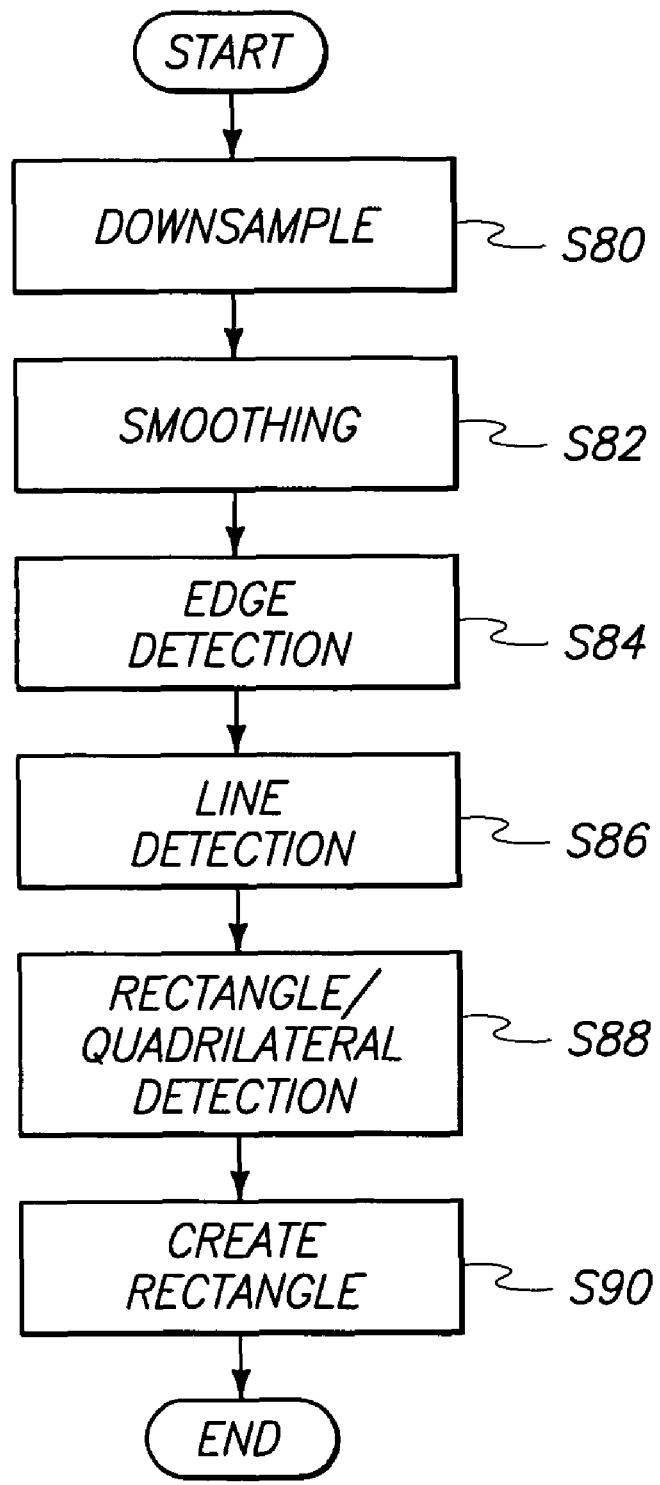
FIG. 8 is a flow chart of another exemplary method for attempting to determine a boundary of an image according to one embodiment.

Referring to FIG. 8, a second boundary detection method is illustrated according to one embodiment. In one searching implementation using the process of FIG. 8 with respect to images comprising book pages, assumptions may be made with respect to the second boundary detection method and may include assuming that page boundaries are very close to perfect lines and are mostly perceivable, the page boundaries are close to perfect rectangles and are the largest rectangles within the images, and pages are bound side-by-side such that the top and bottom generally have improved contrast compared with the left and right boundaries.

In one embodiment, constraints of searching may be imposed. For example, the locations and angles of lines to be searched for a shape (e.g., rectangle) may be reduced. In one example, the processing circuitry may be constrained to search the top and bottom third portions of the image for the top and bottom lines of boundary 34 and the left and right third portions of the image for the left and right lines of boundary 34. A range of angle orientation offsets of searched lines relative to horizontal and vertical may also be set. For example, in searching horizontal lines for the top and bottom lines of boundary 34, the search may be limited to +/−7 degrees relative to horizontal. In addition, a minimum distance between top and bottom lines and left and right lines may also be set. For example, a distance between the top and bottom lines may be set to be no more than a threshold, such as 70%, of the image height and the distance between the left and right lines may be set to be no more than a threshold, such as 70% of the image width. Yet another exemplary constraint on searching may be to set a maximum angular orientation difference (e.g., less than 3 degrees) between top and bottom lines and left and right lines.

At a step S80 of FIG. 8, an image to be processed may be downsampled. One exemplary process for downsampling is implemented by averaging a plurality of pixels in the high resolution image corresponding to a single pixel in the image of lower resolution.

At a step S82, the image may be smoothed. One exemplary process for smoothing is Gaussian smoothing. Details of one Gaussian smoothing process are described in D. A. Forsyth et al., *"Computer Vision—A Modern Approach"*, Section 7.1., Prentice Hall, Upper Saddle River, N.J., 2003, the teachings of which are incorporated by reference herein.

At a step S84, the processing circuitry may perform edge detection processing of the image. Exemplary details of edge detection according to one embodiment are described in a U.S. patent application, having Ser. No. 10/768,461, entitled Image Processing Methods and Systems, naming Jian Fan as inventor, filed on Jan. 30, 2004, now U.S. Publication Application No. 2005/0169531 A1, which published on Aug. 4, 2005, assigned to the assignee of the present application, and the teachings of which are incorporated herein by reference.

At a step S86, the processing circuitry may perform line detection processing of the image after the edge detection. Exemplary details of line detection according to one embodiment are described in the incorporated U.S. patent application.

At a step S88, the processing circuitry may search for the presence of a shape (e.g., rectangle) in the image. The processing circuitry may perform rectangle/quadrilateral detection processing of the image after the line detection in an attempt to locate the shape in the image. Exemplary details of rectangle/quadrilateral detection according to one embodiment are described in the incorporated U.S. patent application.

At a step S90, a rectangle corresponding to the image boundary for the image may be determined if an appropriate quadrilateral was detected in step S88. At step S90, the processing circuitry may compute a line quality metric μ for the four lines of the detected quadrilateral. One metric may be defined as a ratio of the longest connected segment over a nominal length of the overall line segment. For the top and bottom lines with indexes 0 and 2, compute $w_h=0.5\cdot(\mu_0+\mu_2)\cdot|\cos(20\cdot(\theta_0-\theta_2))|$. For the left and right lines with indexes 1 and 3, compute $w_v=0.5\cdot(\mu_1+\mu_3)\cdot|\cos(20\cdot(\theta_1-\theta_3))|$. $W_h$ and $w_v$ are quality values for a horizontal and vertical pair of lines and $\theta_j$ is the angle of the line j. If $w_h>w_v$, compute an angle $\theta_h=(\mu_0\cdot\theta_0+\mu_2\cdot\theta_2)/(\mu_0+\mu_2)$ and assign it to the top and bottom lines. Accordingly, the angles for left and right lines are determined. The four lines are further determined by passing them through the middle points of their prior orientations. Otherwise, for $w_h\leq w_v$, $\theta_v=(\mu_1\cdot\theta_1+\mu_3\cdot\theta_3)/(\mu_1+\mu_3)$ is used for the left and right lines and the angle and positions of the lines are adjusted using the same method. The resultant lines define a rectangle corresponding to the boundary 34 of the image.

With respect to cropping and deskewing operations, it may be desired to provide information regarding the binding sides of images comprising pages of a book. One exemplary procedure for determining the binding sides may assume pages are in consecutive order, and accordingly, the process may determine the binding side of odd (or even) numbered pages. Further, by an assumption that each image contains one single page, a dark margin appears on a non-binding side.

After the method of FIG. 3 has been performed on N consecutive images, information regarding the presence of dark margins in the images is known and the images may be classified as being left-bound or right-bound and the results may be counted where:

$S_{O,L}$ is the number of odd numbered pages classified as left-bound;

$S_{O,R}$ is the number of odd numbered pages classified as right-bound;

$S_{E,L}$ is the number of even numbered pages classified as left-bound;

and $S_{E,R}$ is the number of even numbered pages classified as right-bound.

If $(S_{O,L}+S_{E,R})>(N-2)$, the odd-numbered pages are determined to be left-bound and the even numbered pages are right-bound. The odd-numbered pages are determined to be right-bound (and the even numbered pages left-bound) if $(S_{O,R}+S_{E,L})>(N-2)$. More than one page is deemed to be misclassified and the analysis may quit if none of the two above-conditions are satisfied.

Figure 9:
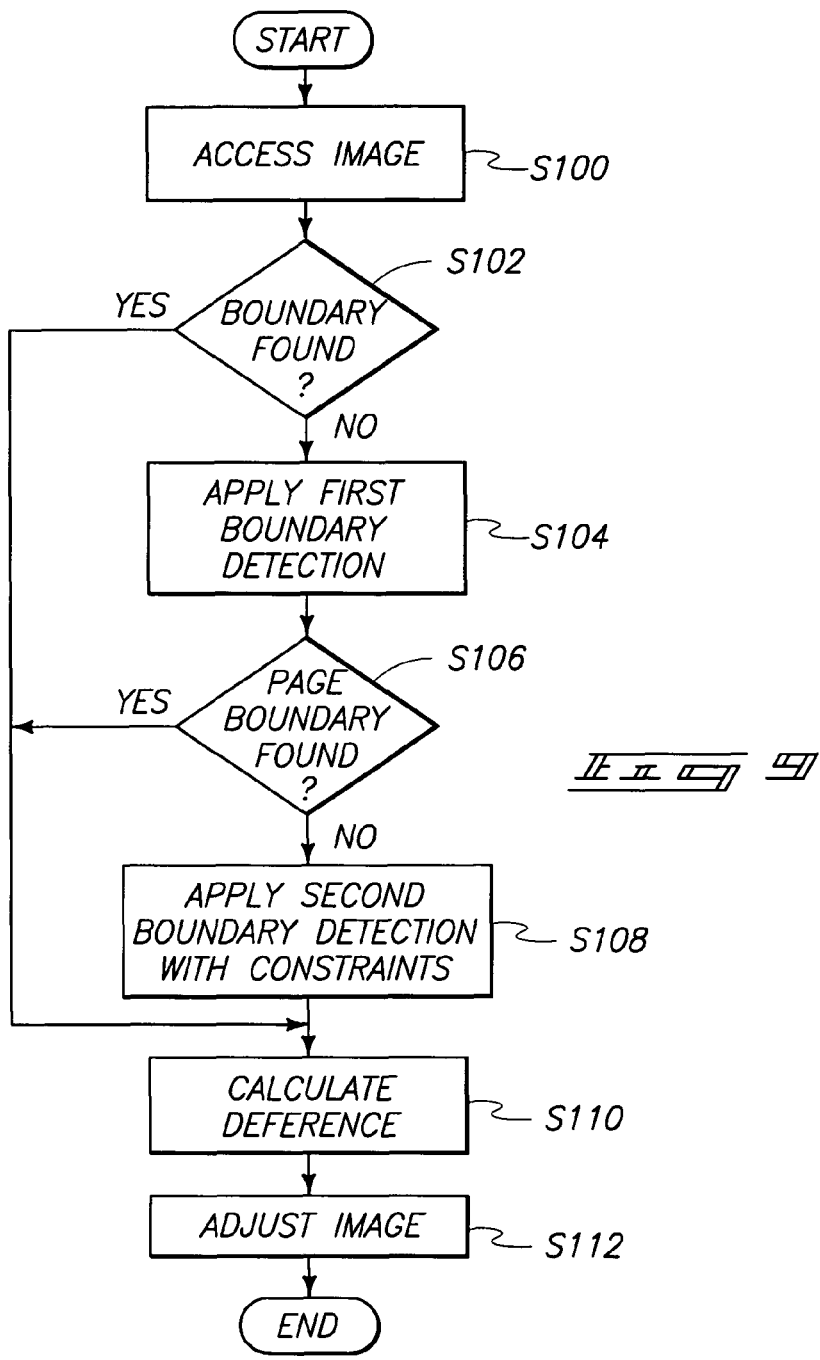
FIG. 9 is a flow chart of an exemplary method for cropping and deskewing an image according to one embodiment.

Referring to FIG. 9, steps of an exemplary method of cropping and deskewing are illustrated. For example, for bound book processing, the processing circuitry attempts to crop and deskew the pages of a scanned book into a common dimension (e.g., width $W_p$ and height $H_p$ determined above). An area to be cropped and deskewed is specified by a rectangle of four lines which may not necessarily be aligned to an image boundary 34. A rectangle with the same dimension as the page dimension corresponding to image boundary 34 is identified for individual images as described below.

At a step S100, the processing circuitry accesses an image to be processed.

At a step S102, the processing circuitry determines whether previous processing of the image was able to identify a boundary 34 of the image, for example using the methods of FIGS. 5 or 8. If the condition of step S102 is affirmative, the process proceeds to a step S110.

Otherwise, at a step S104, the processing circuitry performs a first boundary detection method. Initially, the processing circuitry may repeat the method described above with respect to FIG. 5.

At a step S106, it is determined whether a page boundary has been found. If the condition of step S106 is affirmative, the processing circuitry may proceed to step S110.

Figure 10:
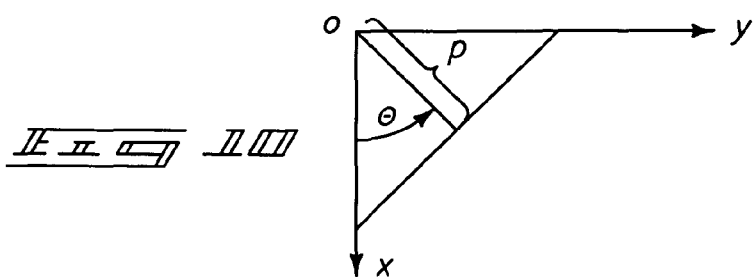
FIG. 10 is an illustrative representation of lines according to one embodiment.

Otherwise, at a step S108, the processing circuitry may utilize the method of FIG. 8 with additional information of the page dimension where improved reliability is achieved. For example, in attempting to locate the two vertical lines and the two horizontal lines of the image boundary, extra constraints may be used which may specify that a distance between the respective two lines does not exceed a range of the page dimension by a set percentage (e.g., +/-7% of the respective page dimension). Referring to FIG. 10, a representation of lines is shown. The top and bottom lines may be selected by sorting horizontal lines in increasing order of $\rho$, and for each horizontal line pair with index n and m, compute a measure of parallel:

$\Theta_{n,m}=|\cos(10\cdot(\theta_n-\theta_m))|$ and the distance between them $D_{n,m}=(\rho_m-\rho_n)$. If $\Theta_{n,m}<0.85$ or $(D_{n,m}/H_p)<0.93$, discount the line pair. Otherwise, compute metric $\lambda_{n,m}=\Theta_{n,m}\cdot D_{n,m}+0.01\cdot(\text{length}_n+\text{length}_m)/W_p$, where $\text{length}_n$ is the verified length of the line segment n.

The line pair having the highest $\lambda$ may be selected as the top and bottom page boundaries.

The left and right lines may be determined by sorting the vertical lines in increasing order of $\rho$ and for right-binding pages, the processing circuitry may start from the leftmost line 0. For each line with index n, find a line m>n and compute $\Theta_{n,m}=|\cos(10\cdot(\theta_n-\theta_m))|$, $D_{n,m}=(\rho_m-\rho_n)$ and $P_n=\rho_n/Wp$; if $\Theta_{n,m}<0.85$ or $(D_{n,m}/W_p)<0.93$ or $(D_{n,m}/W_p)>1.1$, discount the line pair. Otherwise, compute a metric $\lambda_{n,m}=\Theta_{n,m}\cdot P_{n,m}+0.01\cdot(\text{length}_n+\text{length}_m)/H_p$. Similarly for the left-binding pages, start from the rightmost line N-1. For each line with index n, find a line m<n and compute $\Theta_{n,m}=|\cos(10\cdot(\theta_n-\theta_m))|$, $D_{n,m}=(\rho_m-\rho_n)$ and $P_n=(W_p-\rho_n)/W_p$; If $\Theta_{n,m}<0.85$ or $(D_{n,m}/W_p)<0.93$.

At step S110, the processing circuitry compares the detected image boundary dimension for the respective image with the page dimension. In a more specific embodiment, the processing circuitry calculates a difference between the detected image boundary dimension (w, h) and the page dimension by $\Delta W=w-W_p$ and $\Delta H=h-H_p$ indicative of the difference of the detected image boundary and the page dimension.

At a step S112, the image may be adjusted by the difference information $\Delta W$ and $\Delta H$ to perform the cropping and deskewing. In one method, the processing circuitry evenly distributes the adjustment to both sides. In another exemplary method which attempts to crop more of an image from areas of increased noise, the processing circuitry may compute a sum of gradient strength whose magnitude is above a set threshold (e.g., 50) in the range of $\Delta W$ around two vertical lines $A_L$ and $A_R$ and $\Delta W$ may be distributed by $\Delta W_L=\Delta W\cdot A_L/(A_L+A_R)$ and $\Delta W_R=\Delta W\cdot A_R/(A_L+A_R)$. The same method may be used for top and bottom line adjustment. Areas outside of the rectangle adjusted by $\Delta W$ and $\Delta H$ may be removed from the image. The cropping of content according to the adjusted rectangle also deskews the remaining content of the image since the adjusted rectangle accounts for the possibility of a skew angle.

Referring to FIG. 11, an exemplary image processing method according to one embodiment is shown. Processing circuitry 14 may perform the depicted method in one embodiment. Other methods are possible including more, less or alternative steps.

At a step S120, the image dimension described above is defined. The image dimension may be defined as provided at step S34 of FIG. 4 in one embodiment.

At a step S122, image boundaries of respective ones of the images are defined. A plurality of exemplary methods for defining the image boundaries are recited above with respect to the embodiments of FIGS. 5 and 8.

At a step S124, individual ones of the image boundaries are compared with the image dimension to provide respective difference information corresponding to respective ones of the images. An exemplary method for determining difference information is discussed above with respect to step S110 of FIG. 9.

At a step S126, individual ones of the images may be adjusted using the respective difference information to implement cropping and deskewing.

The protection sought is not to be limited to the disclosed embodiments, which are given by way of example only, but instead is to be limited only by the scope of the appended claims.

What is claimed is:

1. An image processing method comprising:
   defining an image dimension corresponding to a common size of data content of a plurality of images which are associated with one another;
   determining a plurality of image boundaries individually corresponding to a size of the data content of a respective one of the images;
   comparing respective dimensions of individual ones of the image boundaries to the image dimension to obtain difference information for respective ones of the images and indicative of differences of the respective image boundaries with respect to the image dimension; and
   adjusting the images based on the respective difference information corresponding to respective ones of the images.

2. The method of claim 1 wherein the images include a plurality of pages of a bound book; and
   further comprising identifying binding sides of the pages corresponding to sides of the pages bound to a spine of the book, and wherein the adjusting comprises adjusting using the identified binding sides.

3. The method of claim 1 wherein the determining comprises, for one of the images:
   identifying an initial bounding box corresponding to a size of body content of the one of the images; and
   increasing the size of the initial bounding box to another bounding box corresponding to the image boundary of the one of the images.

4. The method of claim 3 wherein the initial bounding box does not include margins about the body content and the another bounding box includes the margins.

5. The method of claim 1 wherein the determining comprises, for one of the images, searching the one of the images for a defined shape corresponding to a shape of the data content of the one of the images.

6. The method of claim 5 wherein the searching comprises searching the one of the images for a plurality of lines of the defined shape.

7. The method of claim 6 further comprising restricting the search for the lines to a plurality of regions of the one of the images corresponding to the top portion, bottom portion, left portion and right portion of the one of the images.

8. The method of claim 1 further comprising identifying the presence of margins in the images, and wherein the adjusting is responsive to the identified presence of the margins.

9. The method of claim 1 wherein the adjusting comprises, based on the respective difference information, cropping at least a portion of one of the images and deskewing another of the images.

10. The method of claim 1 further comprising determining whether to perform the adjusting of the images using the images and wherein the adjusting is responsive to the determining.

11. Apparatus, comprising:
    a computer-readable medium storing computer-readable instructions and calibration-enabling data comprising a reference set of image features characterizing a reference image in a reference coordinate space and rendering information describing a physical rendering of the reference image; and
    processing circuitry coupled to the computer-readable medium, operable to execute the instructions, and based at least in part on the execution of the instructions operable to perform operations comprising
    defining an image dimension corresponding to a common size of data content of a plurality of images which are associated with one another;
    determining a plurality of image boundaries individually corresponding to a size of the data content of a respective one of the images;
    comparing respective dimensions of individual ones of the image boundaries to the image dimension to obtain difference information for respective ones of the images and indicative of differences of the respective image boundaries with respect to the image dimension; and
    adjusting the images based on the respective difference information corresponding to respective ones of the images.

12. The apparatus of claim 11 wherein in the determining, the processing circuitry is operable to perform operations comprising identifying an initial bounding box corresponding to body content of the another of the images, and increasing the size of the initial bounding box to another bounding box including margins about the body content; and wherein in the identifying, the processing circuitry is operable to perform operations comprising identifying the portion of the another of the images comprising content of the image external of the another bounding box.

13. The apparatus of claim 11 wherein in the identifying, the processing circuitry is operable to perform operations comprising identifying a defined shape within the another of the images to identify the portion of the another of the images.

14. The apparatus of claim 13 wherein in the identifying, the processing circuitry is operable to perform operations comprising searching the another of the images for the presence of a plurality of lines of the defined shape comprising a rectangle.

15. The apparatus of claim 11 wherein in the adjusting, the processing circuitry is operable to perform operations comprising, based on the respective difference information, cropping at least a portion of one of the images and deskewing another of the images.

16. The apparatus of claim 11 wherein the images comprise images of a book, and wherein based at least in part on the execution of the instructions the processing circuitry is operable to perform operations comprising identifying binding sides of the one and the another images bound to a spine of the book, and cropping the identified portion of the another of the images using the identification of the binding sides.

17. A non-transitory computer-readable medium comprising program instructions that, when executed by processing circuitry, cause the processing circuitry to perform operations comprising:
    accessing a plurality of images corresponding to a plurality of pages of a book;

defining a page dimension corresponding to a common size of data content of the images;

determining a plurality of page boundaries individually corresponding to a respective one of the images;

analyzing respective dimensions of the page boundaries to the page dimension to obtain difference information for respective ones of the images and indicative of differences of the respective image boundaries with respect to the image dimension; and cropping the images based on the difference information.

* * * * *